(12) United States Patent
Thomas

(10) Patent No.: US 6,468,147 B1
(45) Date of Patent: Oct. 22, 2002

(54) RECREATIONAL VEHICLE VENT CAP COVER AND METHOD

(75) Inventor: Michael D. Thomas, Ocala, FL (US)

(73) Assignee: Camco Manufacturing, Inc., Greensboro, NC (US)

(*) Notice: Subject to any disclaimer, the term of this patent is extended or adjusted under 35 U.S.C. 154(b) by 0 days.

(21) Appl. No.: 09/800,319

(22) Filed: Mar. 6, 2001

(51) Int. Cl.$^7$ .................................................. B60H 1/26
(52) U.S. Cl. ...................... 454/136; 454/199; 454/367; 296/216.02
(58) Field of Search .......................... 454/94, 136, 199, 454/367; 296/210, 216.01, 216.02

(56) References Cited

U.S. PATENT DOCUMENTS

| | | | | |
|---|---|---|---|---|
| 2,550,353 A | * | 4/1951 | Hopfinger | 454/136 X |
| 3,867,486 A | * | 2/1975 | Nagele | 454/136 X |
| 4,038,911 A | * | 8/1977 | Hart | 454/94 |
| D285,546 S | | 9/1986 | Hayslette | |
| 4,615,263 A | * | 10/1986 | Titterud | 454/94 |
| 4,759,270 A | * | 7/1988 | Lindeen | 454/136 X |
| D320,267 S | | 9/1991 | Thomas | |
| D320,847 S | | 10/1991 | Lanigan | |
| 5,081,914 A | * | 1/1992 | Mejia | 454/367 X |
| D330,415 S | | 10/1992 | Thomas | |
| D330,588 S | | 10/1992 | Lindeen | |
| 5,309,972 A | | 5/1994 | Thomas | |
| 5,672,101 A | * | 9/1997 | Thomas | 454/136 |
| 6,293,862 B1 | * | 9/2001 | Jafine et al. | 454/367 X |

OTHER PUBLICATIONS

Maxxairs Original Vent Cap Cover Web Site, 2002, 3 pages.*

* cited by examiner

Primary Examiner—D. Glenn Dayoan
Assistant Examiner—Patricia L. Engle

(57) ABSTRACT

A vent cap cover for a recreational vehicle (RV) is provided which allows for dry air entry during rainy conditions. The vent cap cover allows easy observation of the vent cap and maximum air and light availability. Easy maintenance, cleaning and repairs of the vent cap from the exterior of the RV is possible by simply opening the upper, transparent section of the vent cap cover.

18 Claims, 8 Drawing Sheets

US 6,468,147 B1

RECREATIONAL VEHICLE VENT CAP COVER AND METHOD

FIELD OF THE INVENTION

The invention herein pertains to covers for ventilation caps and particularly pertains to covers for ventilation caps of recreational vehicles (RVs), motor homes, campers and other vehicles having roof vents.

DESCRIPTION OF THE PRIOR ART AND OBJECTIVES OF THE INVENTION

Recreational and other vehicles are provided with air ventilation openings to facilitate the entry of fresh air into the vehicle. Such openings are typically located along the top surface of the vehicle and various types of caps are provided to cover the air vent openings during inclement weather and vehicle storage. Standard air vent caps pivot and have a manually operated mechanism for opening and closing as needed. Thus, when opened fresh air and light enters the vehicle to a desired degree. Screens are often used to prevent insect and debris entry and must be periodically cleaned or replaced when they become clogged. Also, it is not unusual for the vent cap lid and/or mechanism to become damaged and require periodic maintenance.

To alleviate some of the above-described problems, vent cap covers have been devised in the past which allow some air entry, usually along the rear thereof. Certain of these prior art vent cap covers have been molded or formed in one piece and thus require removal in order to maintain the vent cap. Other prior vent cap covers-require additional attachments, other than the attachments conventionally used by the standard vent caps for proper mounting on the RV roof.

In view of the problems and disadvantages of installing and using conventional prior roof vent cap covers, the present invention was conceived and one of its objectives is to provide a two-piece vent cap cover which allows easy viewing, opening and accessibility to the contained vent cap.

Another objective of the present invention is to provide a molded vent cap cover made from durable polymeric materials having a streamlined shape with a relatively short front and a relatively high rear for aerodynamic purposes and fuel economy.

It is yet another objective of the present invention to provide a vent cap cover which includes a transparent upper section hingedly joined to the lower, louvered section for maximum air flow for easy observation of the vent cap when closed and convenient external access for repair of the vent cap.

Various other objectives and advantages of the present invention will become apparent to those skilled in the art as a more detailed description is set forth below.

SUMMARY OF THE INVENTION

The invention herein pertains to a vent cap cover for a recreational or other vehicle and method of using the same. The RV vent cap cover is used in combination with a typical manually operated roof vent cap which can be opened or closed for air entry as desired, even during inclement weather. The vent cap cover consists of a transparent upper section hingedly joined to a lower section having a plurality of rear and side vents. The vent cap cover has a streamlined appearance to prevent or reduce air resistance during traveling. The upper section of the vent cap cover can be opened by lifting the upper section and the contained vent cap is then easily accessible. During installation no special tools are required as the base of the vent cap cover is positioned over the housing of the vent cap and slots in the vent cap cover base are aligned with fastener holes in the vent cap housing for convenient installation. The method of maintaining the vent cap is simplified as such work can be performed on the exterior of the recreational or other vehicle without requiring entry into the vehicle.

DETAILED DESCRIPTION OF THE PREFERRED EMBODIMENTS AND OPERATION OF THE INVENTION

Figure 1:
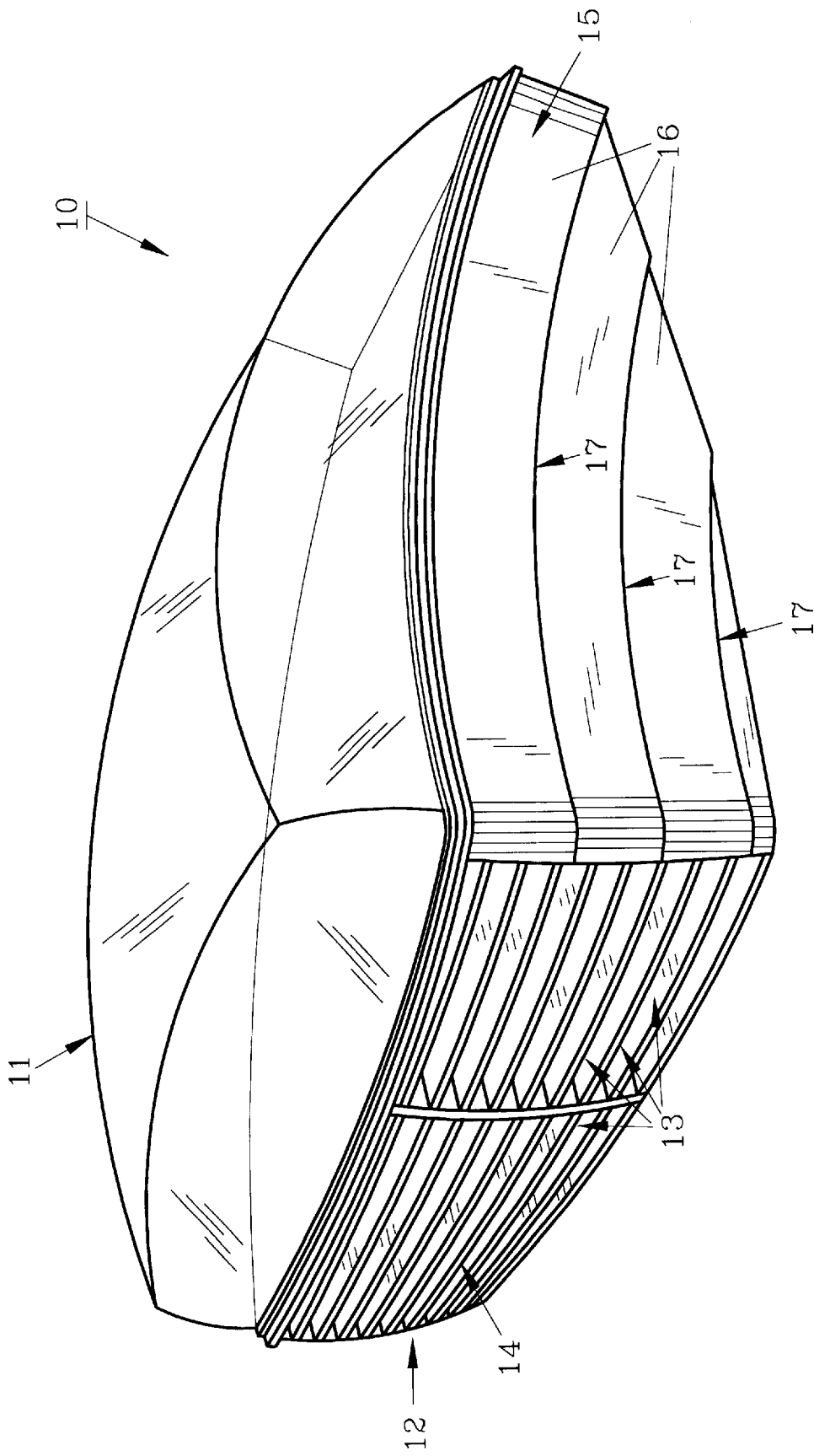
FIG. 1 shows a rear, left side, top perspective view of the preferred form of the recreational vehicle vent cap cover.
Figure 2:
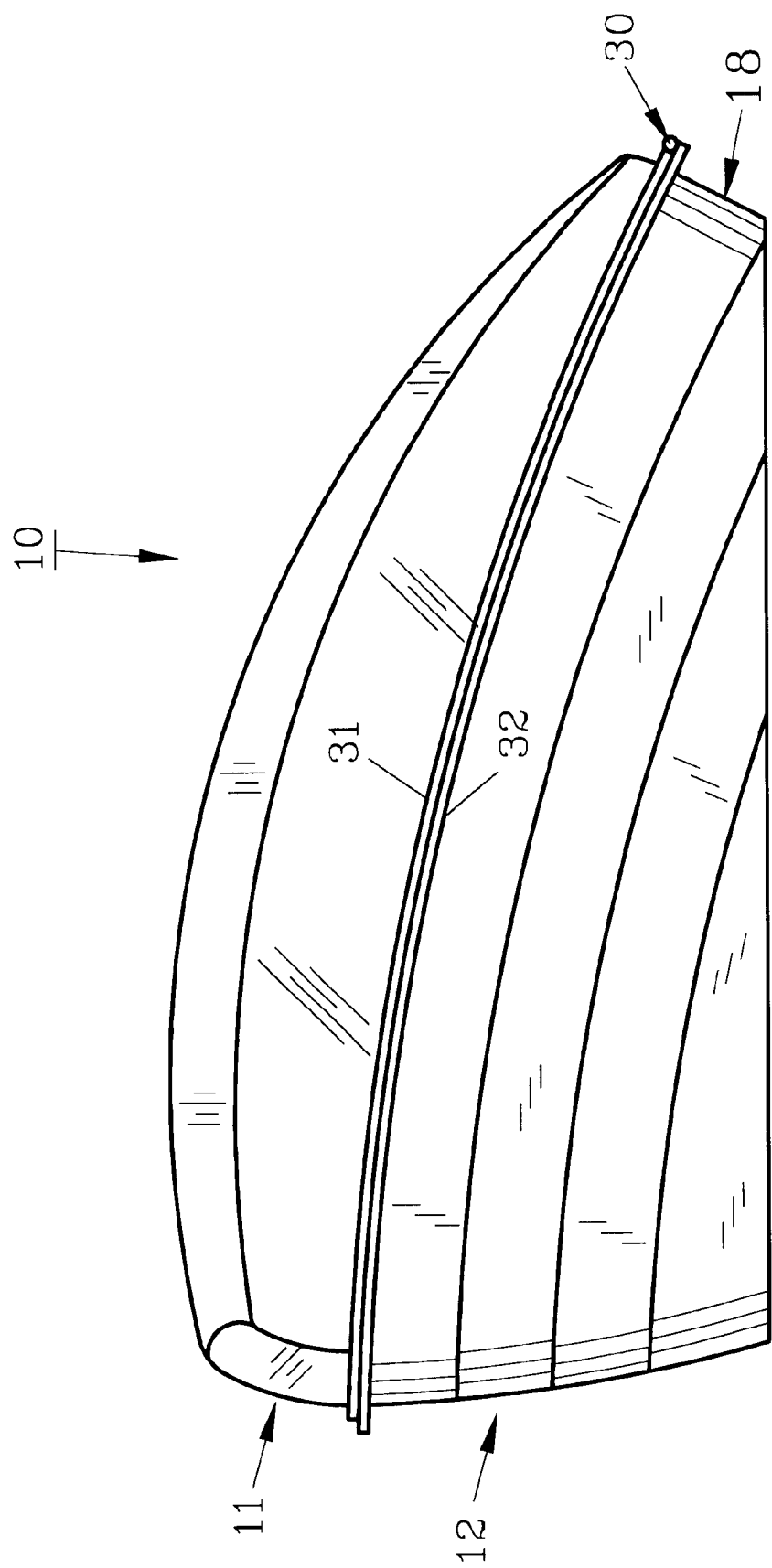
FIG. 2 demonstrates a left side elevational view thereof.
Figure 3:
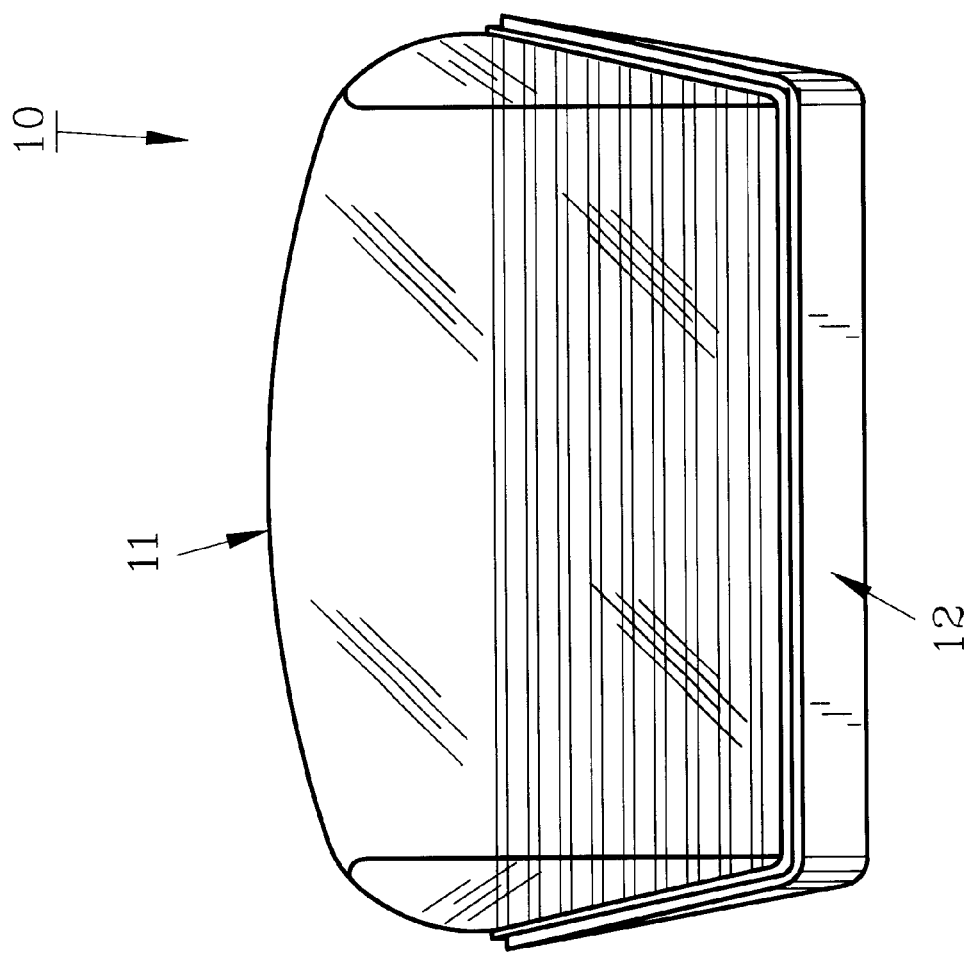
FIG. 3 depicts a front view of the vent cap cover as seen in FIGS. 1 and 2.
Figure 4:
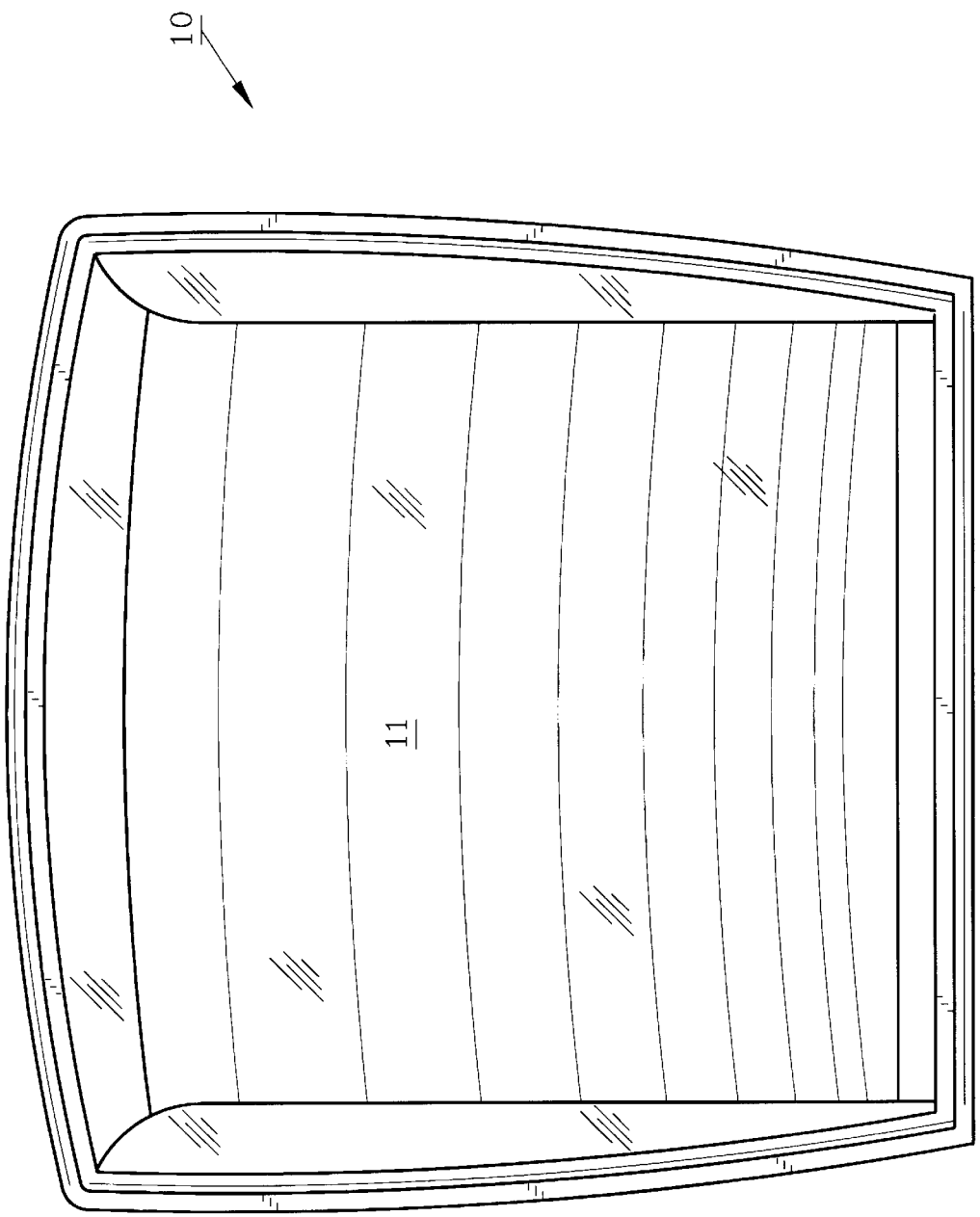
FIG. 4 pictures a top plan view of the vent cap cover as shown in FIG. 1.
Figure 5:
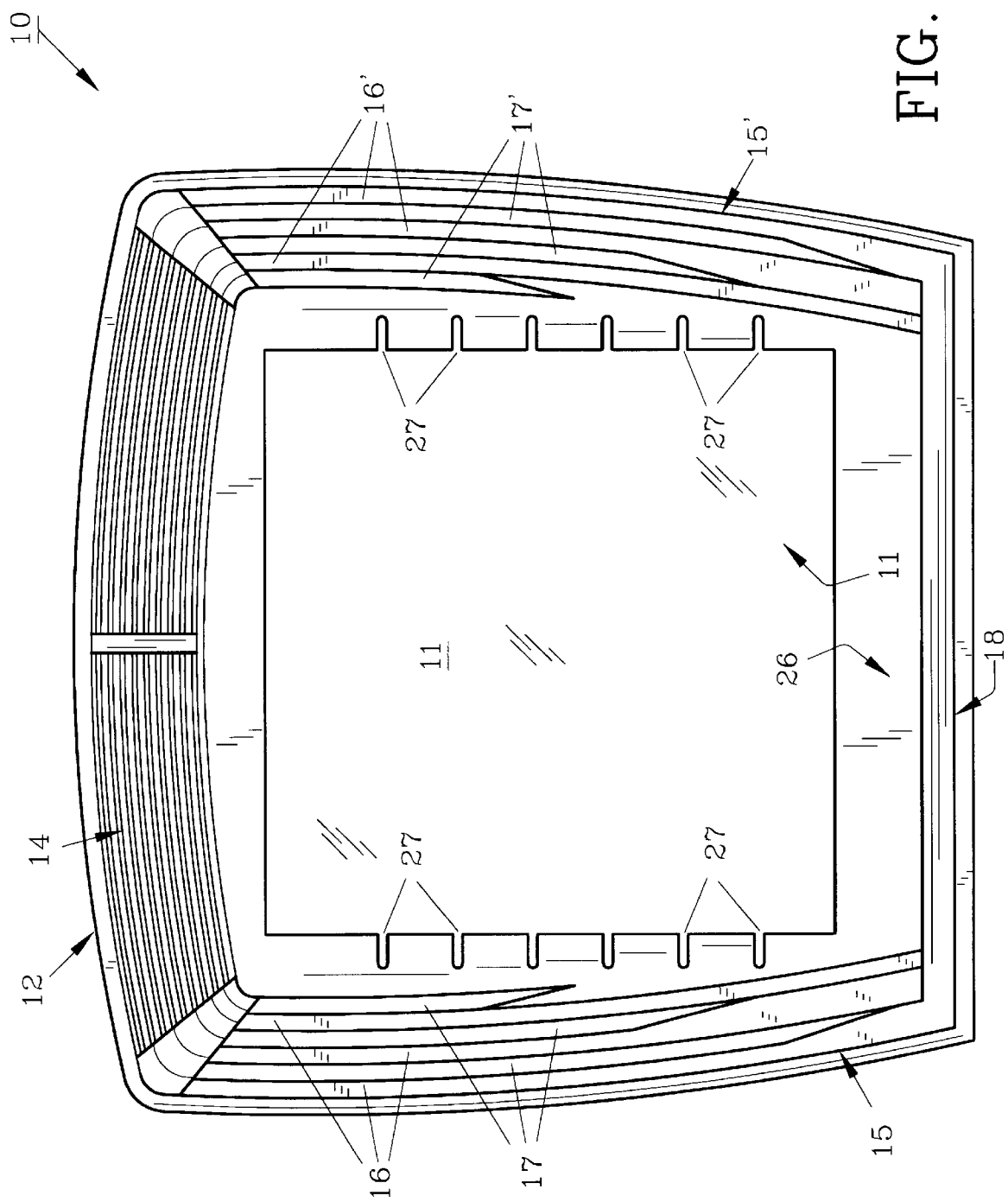
FIG. 5 shows a bottom plan view of the vent cap cover.
Figure 6:
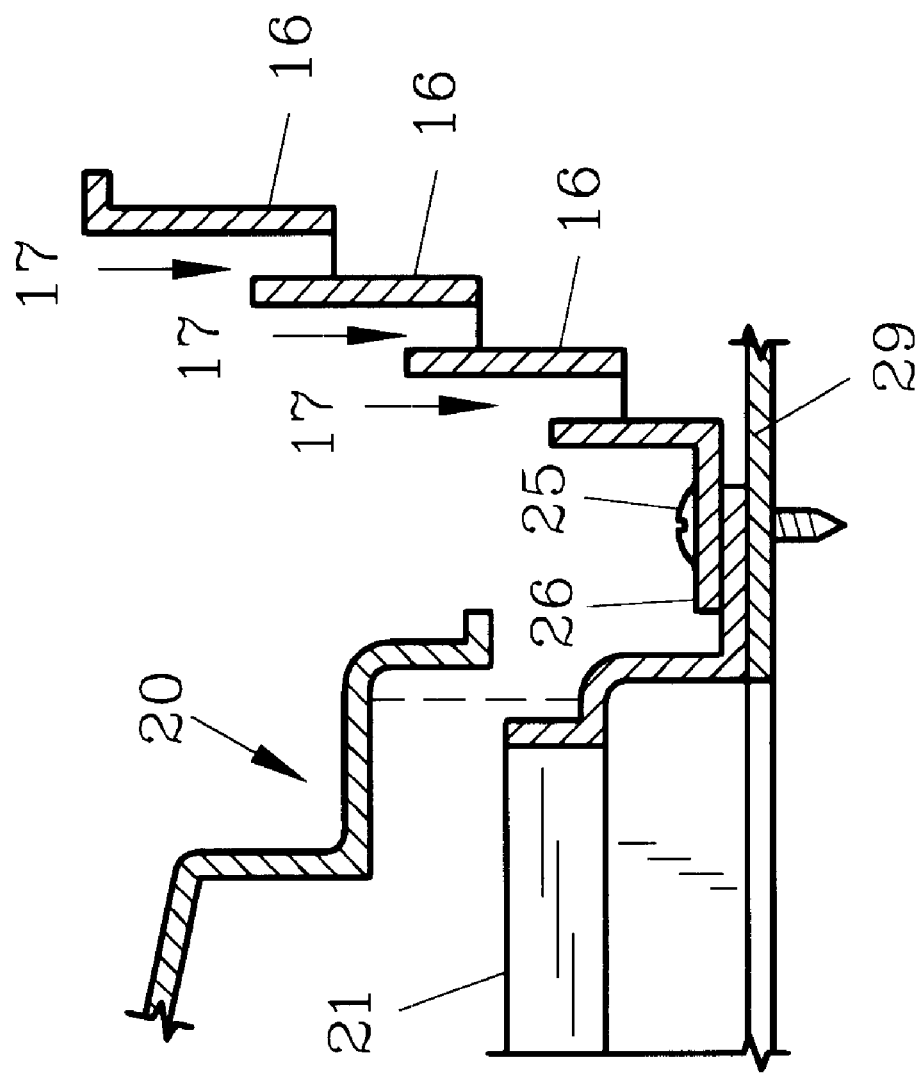
FIG. 6 features a schematic, partial cross-sectional view of side of the vent cap cover and the vent cap therein.
Figure 7:
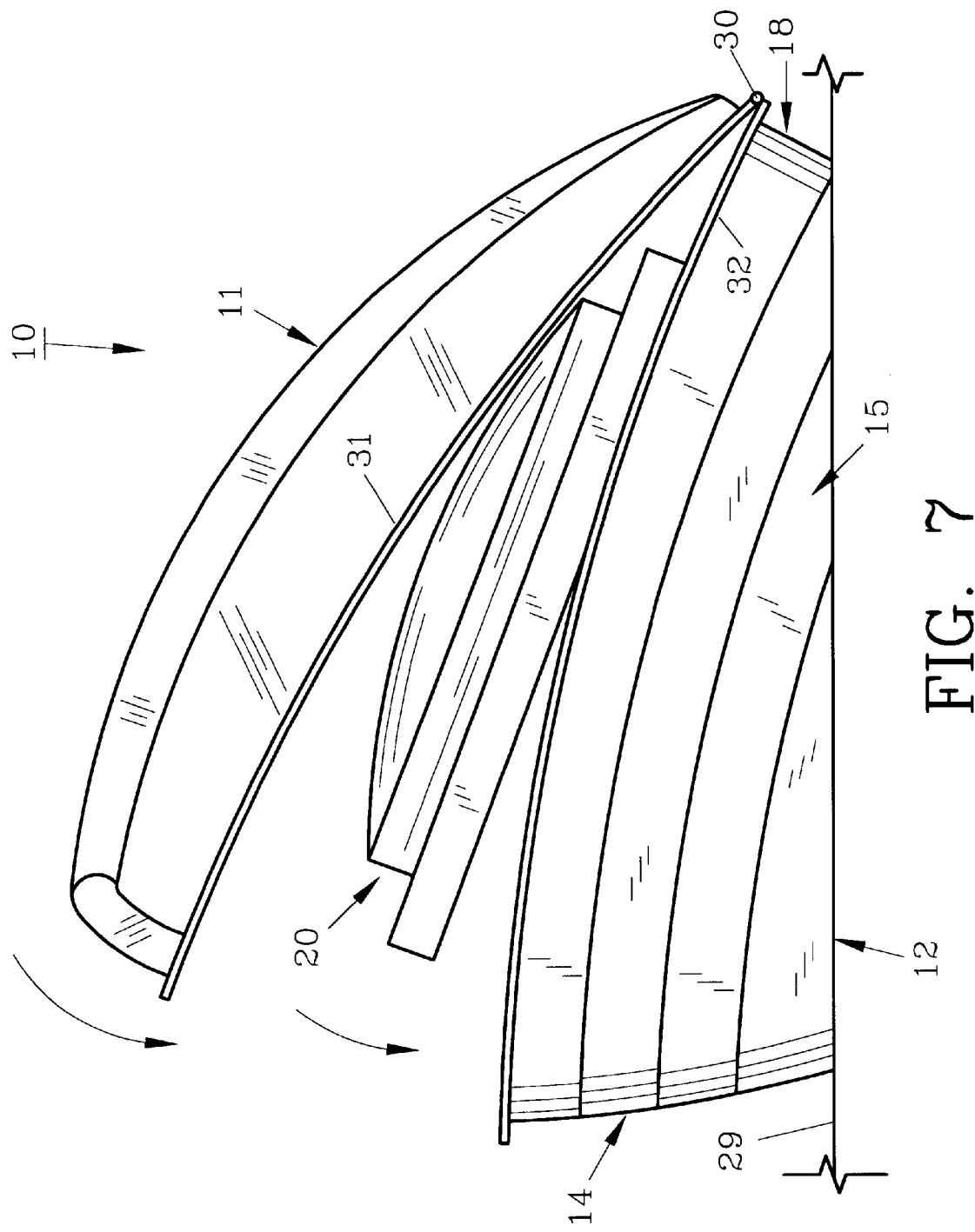
FIG. 7 illustrates another view of the vent cap cover in combination with a typical opened RV vent cap.
Figure 8:
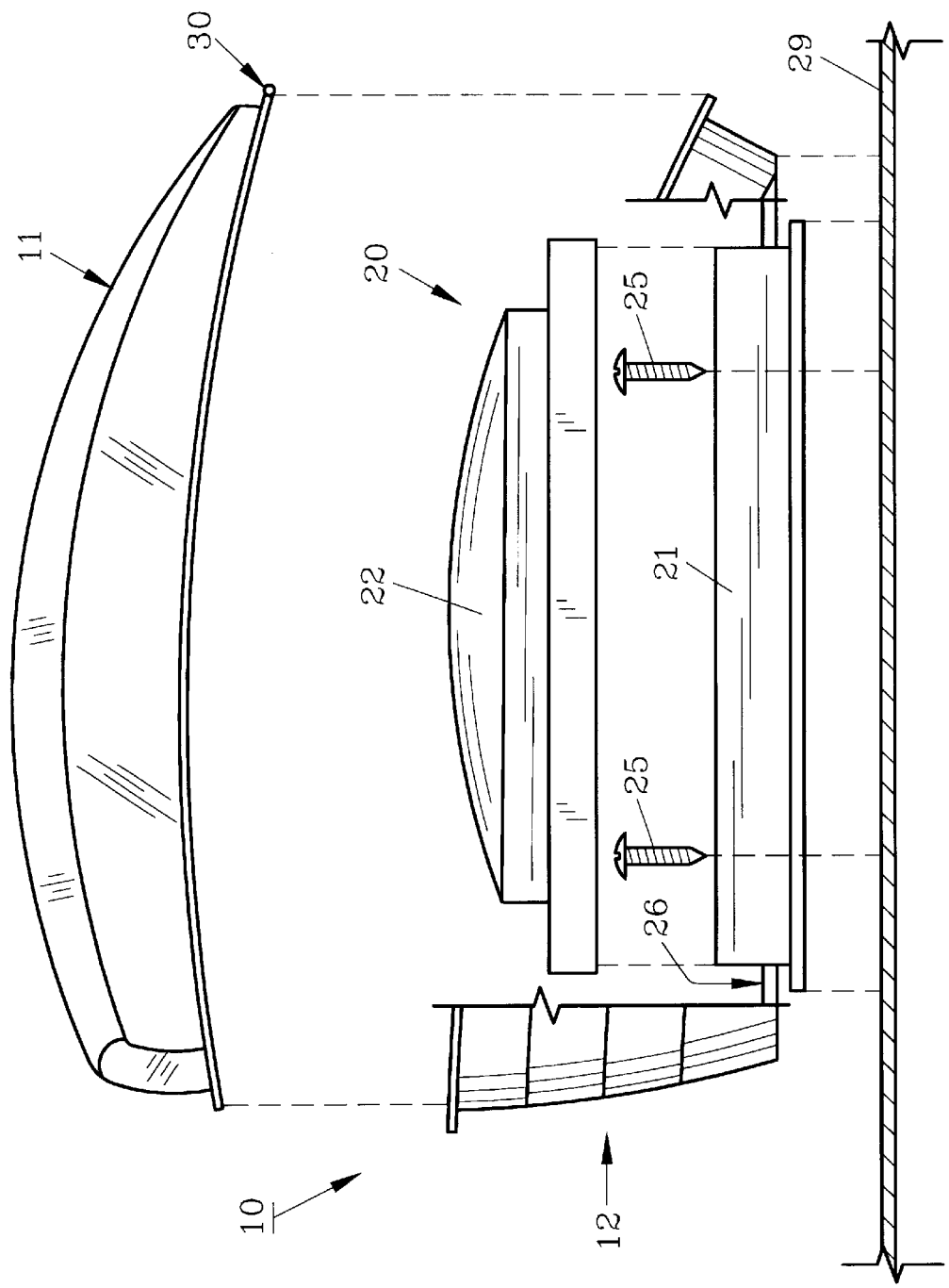
FIG. 8 features a fragmented view of the vent cap cover with the upper section removed and the lower section exploded from the RV roof section.

For a better understanding of the invention and its operation, turning now to the drawings, FIGS. 1–5 illustrate preferred vent cap cover 10 as removed from an RV or the like and without a conventional RV vent cap such as vent cap 20 as seen in FIGS. 7 and 8. As shown in FIG. 1, preferred vent cap cover 10 includes transparent upper section 11 and opaque lower section 12 formed such as by molding from suitable polymeric materials including but not limited to polycarbonates, polyacrylates or otherwise. Lower opaque section 12 defines a plurality of vents or openings 13 within rear 14 for air entry. Left side 15 and right side 15' (not seen in FIG. 1) include a series of louvers 16, 16' which provide a trio of vents 17, 17' respectively therebetween, also for air entry. Vents 17 are also seen in FIGS. 5 and 6 (schematically) which are protected against water entry during rainy conditions.

In FIGS. 7 and 8, conventional vent cap 20 is shown, which as would be understood is preferably affixed to RV roof section 29 with screws 25 (also shown in FIG. 6), although bolts, adhesives or other fasteners may also be used. RV vent cap housing 21 is affixed to RV roof section 29 as usual with screws 25 which can be protected and improved by installing vent cap cover 10. Vent cap cover 10 is secured in place by removing screws 25, placing lower section 12 over housing 21 by coincidental alignment of screw slots 27 defined in base 26 with the fastener holes in housing 21 (see FIG. 6) and then replacing screws 25. Thus, removal of vent cap 20 from the RV is not necessary during installation of vent cap cover 10. Once lower section 12 has been secured to vent cap housing 21, transparent upper section 11 can then be hingedly joined to lower section 12 by attaching hinge 30 (FIG. 8) which is mounted at the front of lip 31 on upper section 11. Hinge 30 is then attached as conventional by screws or other fasteners to lip 32 of lower section 12 as seen in FIGS. 7 and 8. Hinge 30 is preferably a standard metal hinge although a plastic, fabric or other type of hinge may be used.

Should a maintenance or operational problem arise with vent cap 20 once contained within vent cap cover 10, maintenance can be easily performed without the removal of vent cap cover 10 from the RV. In the preferred method of maintenance, upper section 11 is manually pivoted to an open position as in FIG. 7. Thereafter, access to vent cap cover 20 is readily available. Once maintenance has been completed, vent cap 20 can be closed as needed and vent cap cover upper section 11 can then likewise be closed until further maintenance is needed. Should vent cap cover 10 be damaged by adverse weather elements such as hail or the like, or be otherwise damaged during use, vent cap cover 10 can be quickly removed externally of the RV with simple hand tools for repairs or replacement.

The preferred method of maintaining vent cap 20 as shown in FIGS. 7 and 8 in a useable, operable condition, includes the step of observing vent cap 20 through transparent upper section 11 for detection of damage, corrosion or the like. Should any such problems be seen, upper section 11 can be easily opened, externally of the RV and vent cap 20 can then be manually contacted for adjustments with tools or the like. Hinge 30 allows upper section 11 of vent cap cover 10 to be pivoted forwardly, towards front 18 whereby vent cap cover 20 becomes easily accessible while remaining within lower section 12. Should lid 22 of vent cap 20 require removal, it can be easily replaced with vent cap cover 10 opened. Thereafter, upper section 11 of vent cap cover 10 can be pivoted to its normal, closed position which allows vent cap 20 to open and operate in its normal manner.

The illustrations and examples provided herein are for explanatory purposes and are not intended to limit the scope of the appended claims.

I claim:

1. A cover for a vent cap comprising: a lower section, an upper section, said lower section defining a plurality of side vents and a large central opening for receiving a mounted vent cap therethrough, said upper section formed from a transparent material, said upper section pivotally joined to said lower section.

2. The vent cap cover of claim 1 further comprising a mounting flange, said mounting flange attached to said lower section internally thereof.

3. The vent cap cover of claim 1 further comprising a hinge, said hinge attached to said upper section and to said lower section.

4. The vent cap cover of claim 1 wherein said lower section comprises a front, a rear, and two sides, said front joined to each side, said rear joined to each side to form a compartment for enclosing a vent cap housing, said rear and said sides each defining an aperture.

5. The vent cap cover of claim 4 wherein said rear is relatively high and said front is relatively low.

6. The vent cap cover of claim 4 further comprising a hinge, said hinge attached to said front.

7. The vent cap cover of claim 1 further comprising an upper section lip, said upper section lip attached to said upper section, a lower section lip, said lower section lip attached to said lower section, said upper section lip engaging said lower section lip when said vent cap cover is closed.

8. A vent cap and cover in combination, said vent cap comprising: a housing, a pivotable cap, said cap attached to said housing, said cover comprising an upper section, a lower section, said lower section defining a large central opening, said lower section releasably attached to said upper section, said cover receiving said vent cap through said central opening for attachment thereto whereby said vent cap can be opened and closed within said vent cap cover and said upper section can be removed for accessing said vent cap.

9. The combination of claim 8 wherein said lower section further comprises an internal mounting flange, said vent cap housing attached to said mounting flange.

10. The combination of claim 8 wherein said cover upper section is hingedly joined to said lower section.

11. A method of maintaining a vent cap contained within a cover having an upper transparent section and a lower section comprising the steps of:

a) observing the vent cap through the cover;

b) pivotally opening the upper section of the cover; and c) contacting the vent cap.

12. The method of claim 11 further comprising the step of removing the vent cap from the cover.

13. The method of claim 11 wherein observing the vent cap comprises viewing the vent cap through the cover upper section.

14. The method of claim 11 wherein opening the upper section comprises the step of pivoting the upper section from the bottom section.

15. The method of claim 11 wherein contacting the vent cap comprises the step of manipulating the vent cap within the cover.

16. A cover for a vent cap comprising: a lower section, an upper section, said lower section defining a side vent and a large central opening for receiving a vent cap therethrough, said upper section releasably joined to said lower section whereby said cover can be opened by releasing said upper section.

17. The cover of claim 16 formed from a polymeric material.

18. The cover of claim 16 wherein said lower section is opaque.

* * * * *